US006934536B2

(12) United States Patent
Yoshioka (10) Patent No.: US 6,934,536 B2
(45) Date of Patent: Aug. 23, 2005

(54) SCHEDULE MANAGEMENT DEVICE AND SCHEDULE MANAGEMENT METHOD AND RECORDING MEDIUM RECORDING THE SCHEDULE MANAGEMENT PROGRAM (75) Inventor: Kenji Yoshioka, Tokyo (JP)

(73) Assignee: NEC Corporation, Tokyo (JP)

( * ) Notice: Subject to any disclaimer, the term of this patent is extended or adjusted under 35 U.S.C. 154(b) by 702 days.

(21) Appl. No.: 09/752,401

(22) Filed: Dec. 28, 2000

(65) Prior Publication Data
US 2001/0006893 A1 Jul. 5, 2001

(30) Foreign Application Priority Data

Dec. 28, 1999 (JP) .......................................... 11-373453

(51) Int. Cl.[7] .................................................. H04M 3/00
(52) U.S. Cl. ...................... 455/418; 455/414; 455/567; 455/435; 455/417; 455/566; 455/502; 379/58; 340/825.44
(58) Field of Search ................................ 455/435, 414, 455/567, 418, 417, 566, 502; 379/58; 340/825.44

(56) References Cited

U.S. PATENT DOCUMENTS 6,463,278 B2 * 10/2002 Kraft et al. .................. 455/418

FOREIGN PATENT DOCUMENTS

| JP | 62-219740 | 9/1987 |
| JP | 62-269547 | 11/1987 |
| JP | 8-335978 | 12/1996 |
| JP | 10-136080 | 5/1998 |
| JP | 10-304452 | 11/1998 |
| JP | 11-46377 | 2/1999 |
| JP | 11-154995 | 6/1999 |
| JP | 11-341111 | 12/1999 |

* cited by examiner

Primary Examiner—Erika A. Gary
Assistant Examiner—David Q Nguyen
(74) Attorney, Agent, or Firm—Scully Scott Murphy & Presser

(57) ABSTRACT

A schedule management device which automatically switches the call receiving operation of the handy phone or the like corresponding to the user's schedule comprises one or more call receiving notification section to notify the user that a call is received from outside, a utilization environment registration section for registration of and reference to the utilization environment schedule for each time zone of the user, a call receiving operation registration section which sets each utilization environment registered to the utilization environment registration section to one of the call receiving notification sections and a call receiving notification execution section which, upon receipt of any call from outside, refers to the current utilization environment of the user registered to the utilization environment registration section and notifies the user of call receiving by the call receiving notification section corresponding to the current utilization environment set in the call receiving operation registration section.

5 Claims, 6 Drawing Sheets

| SETTING STATUS | SPEAKER | | VIBRATOR | DISPLAY |
|---|---|---|---|---|
| | SOUNDING | CALL RECEIVING SOUND | | |
| ORDINARY SETTING | ACCORDING TO ORDINARY SETTING STATUS | | | |
| TYPE A | NO | OFF | NO | NO |
| TYPE B | NO | OFF | YES | YES |
| TYPE C | MAX LEVEL | PATTERN 1 | YES | YES |

FIG. 4

| | |
|---|---|
| DATE INFORMATION | DEC. 24, 2000 |
| START TIME INFORMATION | 10:00 |
| END TIME INFORMATION | 12:00 |
| TYPE INFORMATION | MEETING |
| PLACE | CONFERENCE ROOM NO. 3 |
| PLAN | PROJECT PROGRESS REPORT MEETING |

SCHEDULE MANAGEMENT DEVICE AND SCHEDULE MANAGEMENT METHOD AND RECORDING MEDIUM RECORDING THE SCHEDULE MANAGEMENT PROGRAM

BACKGROUNDS OF THE INVENTION

1. Field of the Invention

The present invention relates to control of the receiving operation by the handy phone, PHS or the like and particularly relates to a schedule management device and schedule management method to control the receiving operations with linking them with the user's schedule and a recording medium recording the schedule management program.

2. Description of the Related Art

Mobile phones such as handy phones and personal handy phones use, as a means to notify receiving of a call, sounding from a speaker or sounder, vibrations made by a vibrator, indication on LCD or lighting of LCD back-light or LED lighting.

The essential point of the call receiving operation is, because of its nature, to assure the user's recognition. From this point of view, the optimum means to notify call receiving can be said to be sounding given by the speaker or sounder.

However, considering the environment where the mobile phones are used at present, sounding operation is not always the optimum means to notify receiving of a call. In a train, for example, sounding operation annoys other passengers. Vibrations given by a vibrator would be more appropriate than sounding from a speaker or sounder in trains because vibrations do not annoy other passenger.

Further, when the user is driving a car, the telephone communication itself is illegal. It is preferable to make no call receiving operation to prevent direct notification of the fact that a call is received to the user.

On the contrary, the most suitable notification means at very noisy places would be operation of all notification means with sounding at the maximum level so as to assure notification of call receiving.

When examining these situations, the same situation does not continue for many days in the actual utilization environment. The situation changes every several hours.

Thus, as means to change the call receiving operation corresponding to the current utilization situation, functions such as "Manner mode" and "Driving mode" have been used conventionally. In other words, while the user is at a place where sounding operation is not allowed or is driving a car, the user activates the manner mode or driving mode to stop the sounding function with switching to the call receiving notification by the vibrator or to stop the call receiving notification itself.

These manner mode or driving mode functions require, however, setting by the user every time. The user often forgets to set the function or forgets to cancel the setting. Further, mode settings do not support various utilization scenes and are standardized.

The user often knows in advance his/her own utilization situation for a particular time zone of the day. Thus, a schedule function has been required for management of call receiving operations corresponding to such user's schedule.

However, conventional technologies to achieve the schedule function on handy phones merely provide the telephones having the message tape with such schedule function as in telephones disclosed in Japanese Patent Application Laid-open (Kokai) No. 219740/1987, No. 335978/1996 and No. 136080/1998. In addition to them, Japanese Patent Application Laid-open (Kokai) No. 269547/1987 discloses a telephone using the technology to transfer the received calls to where the user is according to the user's schedule. However, these technologies could not manage the call receiving function according to the schedule.

SUMMARY OF THE INVENTION

It is an object of the present invention to settle the above drawbacks of the conventional technologies and to provide a schedule management device which automatically switches the call receiving operation of a handy phone or the like corresponding to the user's schedule.

According to the first aspect of the invention, a schedule management device comprises one or more call receiving notification means to notify the user that a call from outside is received, a utilization environment registration means for registration of and reference to the utilization environment schedule for each time zone of the user, a call receiving operation registration means to set each of the utilization environments registered to the utilization environment registration means corresponding to one of the call receiving notification means, and a call receiving notification execution means which, upon receipt of any call from outside, refers to the current utilization environment of the user registered to the utilization environment registration means and notifies the user of the call receiving using the call receiving notification means corresponding to the current utilization environment set in the call receiving operation registration means.

In the preferred construction, the utilization environment registration means registers the utilization environment schedule by the place information indicating where the user is in each of the time zones and the call receiving operation registration means sets every piece of the place information corresponding to one of the call receiving notification means.

In another preferred construction, the call receiving notification means comprises notification means to notify the call receiving by at least sounding operation, vibration operation, lighting operation or display operation or arbitrary combination of these functions.

In another preferred construction, the utilization environment registration means registers the utilization environment schedule by the place information indicating where the user is in each of the time zones and the call receiving operation registration means sets every piece of the place information corresponding to one of the call receiving notification means and the call receiving notification means comprises notification means to notify the call receiving by at least sounding operation, vibration operation, lighting operation or display operation or arbitrary combination of these functions.

In another preferred construction, the device is applied to the handy communication terminal provided with schedule management function.

According to another aspect of the invention, a schedule management method comprising one or more call receiving notification step to notify the user that a call from outside is received, a utilization environment registration step for registration of and reference to the utilization environment schedule for each time zone of the user, a call receiving operation registration step to set each of the utilization environments registered at the utilization environment registration step corresponding to one of the call receiving notification steps, and a call receiving notification execution step which, upon receipt of any call from outside, refers to the current utilization environment of the user registered at the utilization environment registration step and notifies the user of the call receiving using the call receiving notification step corresponding to the current utilization environment set at the call receiving operation registration step.

In the preferred construction, the utilization environment registration step registers the utilization environment schedule by the place information indicating where the user is in each of the time zones and the call receiving operation registration step sets every piece of the place information corresponding to one of the call receiving notification steps.

In another preferred construction, the call receiving notification step comprises a notification step to notify the call receiving by at least sounding operation, vibration operation, lighting operation or display operation or arbitrary combination of these functions.

In another preferred construction, the utilization environment registration step registers the utilization environment schedule by the place information indicating where the user is in each of the time zones and the call receiving operation registration step sets every piece of the place information corresponding to one of the call receiving notification steps and the call receiving notification step comprises a notification step to notify the call receiving by at least sounding operation, vibration operation, lighting operation or display operation or arbitrary combination of these functions.

According to a further aspect of the invention, a computer readable memory recording a schedule management program to control the computer for execution of schedule management characterized by that the schedule management program comprises one or more call receiving notification step to notify the user that a call from outside is received, a utilization environment registration step for registration of and reference to the utilization environment schedule for each time zone of the user, a call receiving operation registration step to set each of the utilization environments registered at the utilization environment registration step corresponding to one of the call receiving notification steps, and a call receiving notification execution step which, upon receipt of any call from outside, refers to the current utilization environment of the user registered at the utilization environment registration step and notifies the user of the call receiving using the call receiving notification step corresponding to the current utilization environment set at the call receiving operation registration step.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

A schedule management device according to the present invention controls the call receiving operation of handy terminals provided with telephone communication function such as a handy phone or a personal handy phone system. It calls the user with appropriate call receiving operation according to the user's schedule setting.

The schedule management device according to the present invention will be described below with taking an example of its application in a handy terminal provided with telephone function.

Figure 1:
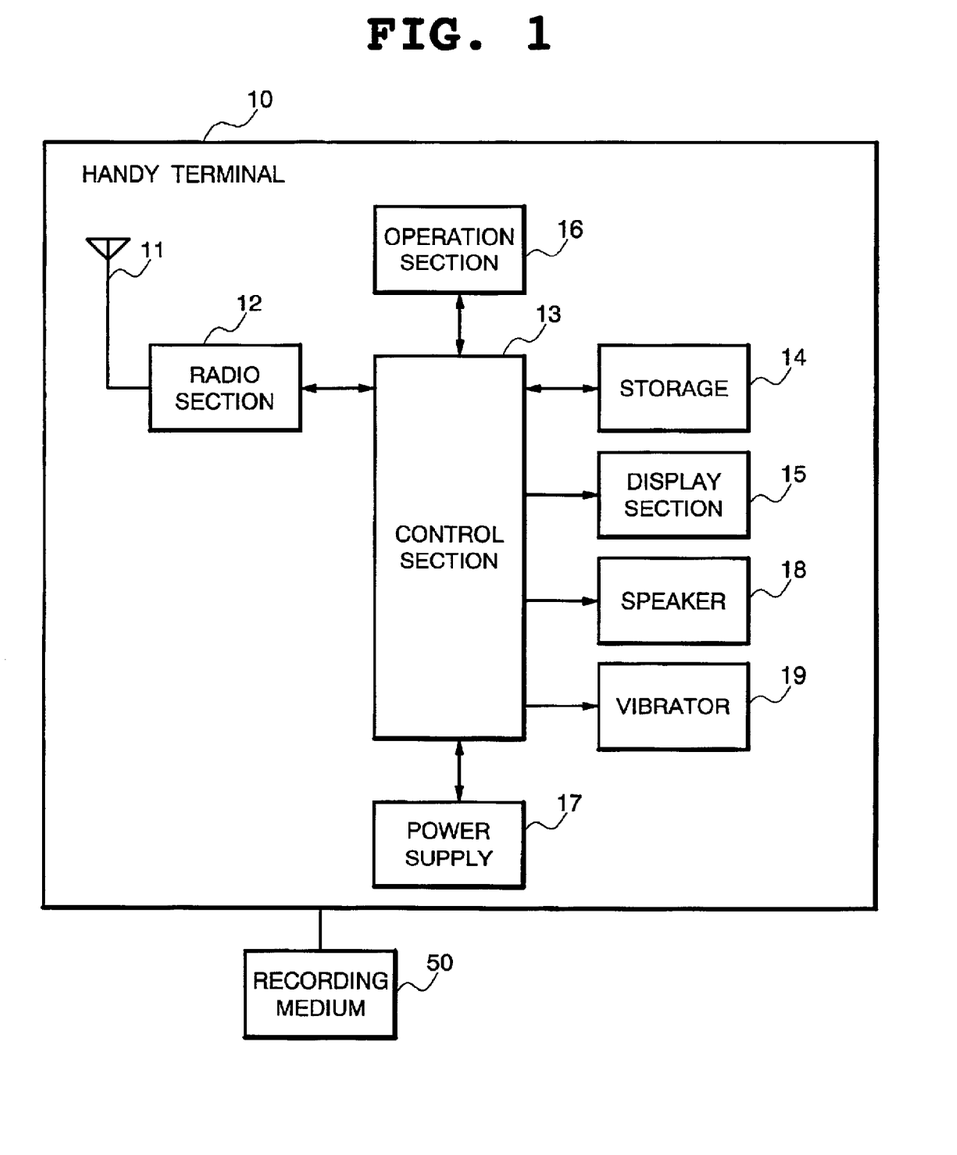
FIG. 1 is a block diagram to show the structure of a handy terminal according to a first embodiment of the present invention.

FIG. 1 is a block diagram showing the structure of a handy terminal 10 according to a first embodiment of the present invention.

Referring to FIG. 1, the handy terminal 10 according to this embodiment comprises an antenna 11, a radio section 12, a control section 13, a storage 14, a display section 15, an operation section 16, a power supply 17, a speaker 18 and a vibrator 19.

The antenna 11 receives the radio wave of the radio telephone and the radio section 12 decodes the high frequency radio signal received by the antenna 11 after frequency conversion and noise removal.

The control section 13 controls other sections of the handy terminal 10. The control section 13 executes the control to detect the caller number information data from the digital signal decoded by the radio section 12 upon call receiving and converts such data into the telephone number. Then, the control section 13 drives the speaker 18 and the vibrator 19 to control the call receiving operation to notify the user of call receiving. The type of the call receiving operation executed here is determined by the control section 13, which refers to the attribute of the schedule data stored in the storage 14 and selects the call receiving operation upon call receiving appropriate to the current schedule of the user by the speaker 18, the vibrator 19 or the display section 15.

The operation section 16 operates various settings related to the schedule function such as setting of the user's schedule data. Operations such as input of telephone numbers related to the telephone function of the handy terminal 10 are also made from the operation section 16.

The power supply 17 comprises dry cells or batteries. It serves as the power supply of the handy terminal 10 and supplies power to the sections constituting the handy terminal 10.

Then, the operation of the handy terminal 10 according to this embodiment will be described below.

Figure 2:
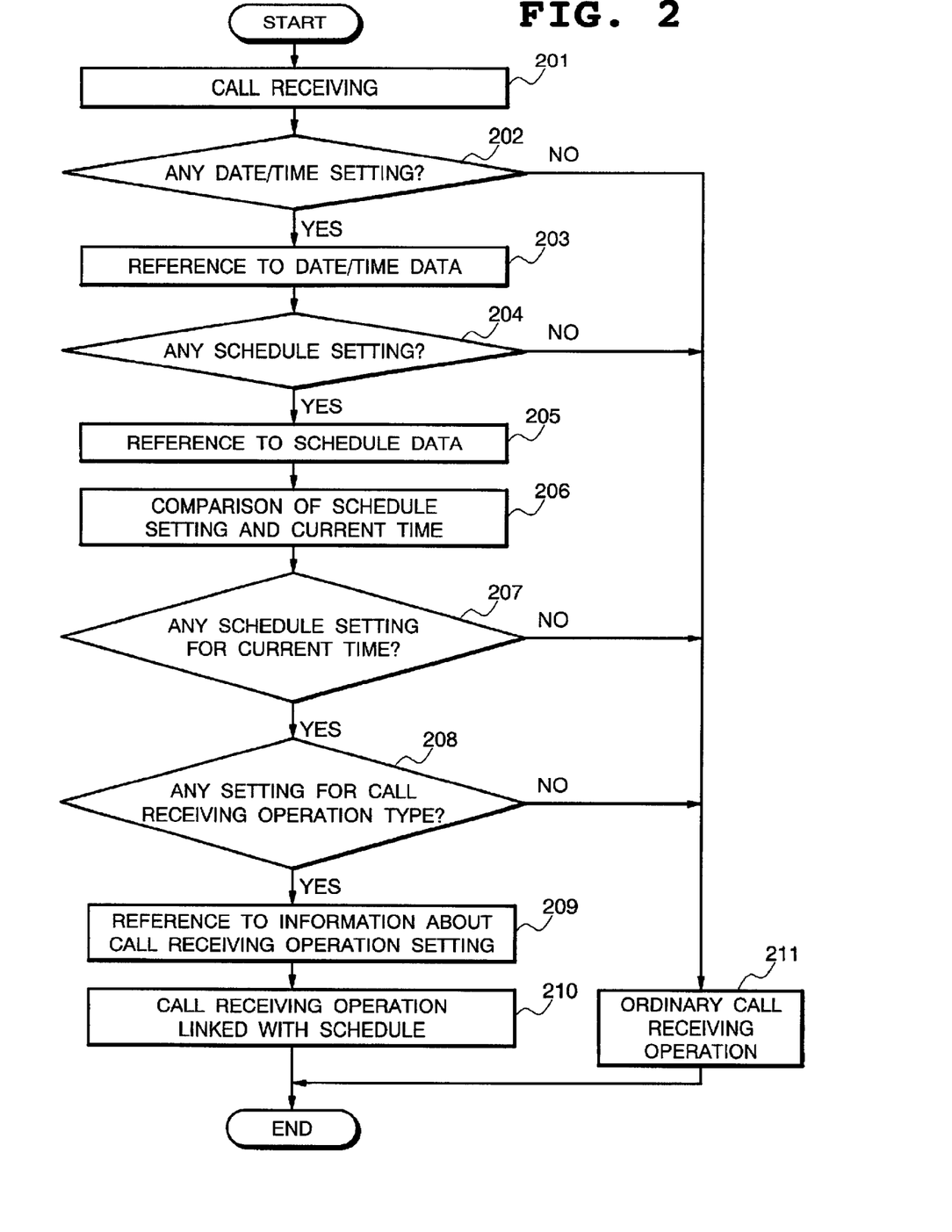
FIG. 2 is a flowchart to illustrate the switching processing for call receiving operation according to a first embodiment of the present invention.

FIG. 2 is a flowchart to illustrate the switching processing for call receiving operations according to this embodiment.

Referring to FIG. 2, when the handy terminal 10 firstly receives a call (Step 201), the control section 13 refers to the storage 14 to judge whether the handy terminal 10 has any date or time setting (Step 202).

The time/date setting is provided to switch the type of the call receiving operation to notify the user of call receiving to the one appropriate to the current schedule of the user using the schedule function.

Figure 3:
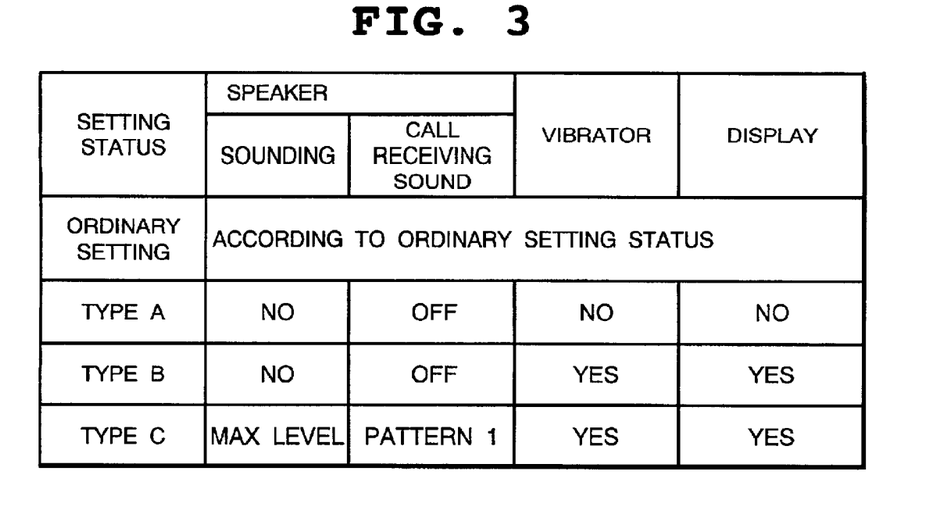
FIG. 3 is a diagram to show an example of schedule types and call receiving operation setting according to a first embodiment of the present invention.

FIG. 3 is a diagram to show an example of schedule type and call receiving operation setting according to this embodiment. As shown in the example of FIG. 3, the contents of the call receiving operation to be achieved by the speaker 18, the vibrator 19 for making vibrations, the display section 15 comprising of LCD or LED and so on are individually set for each type of user's schedule.

If any date/time setting is found here, the control section 13 refers to this date/time setting in the storage 14 (Step 203) and then refers to the storage 14 to judge whether there are any schedule setting (Step 204). The schedule setting here means the schedule of the call receiving operations set by the user. The type of the call receiving operation to be executed and the time zone to execute such call receiving operation are specified for the setting.

Figure 4:
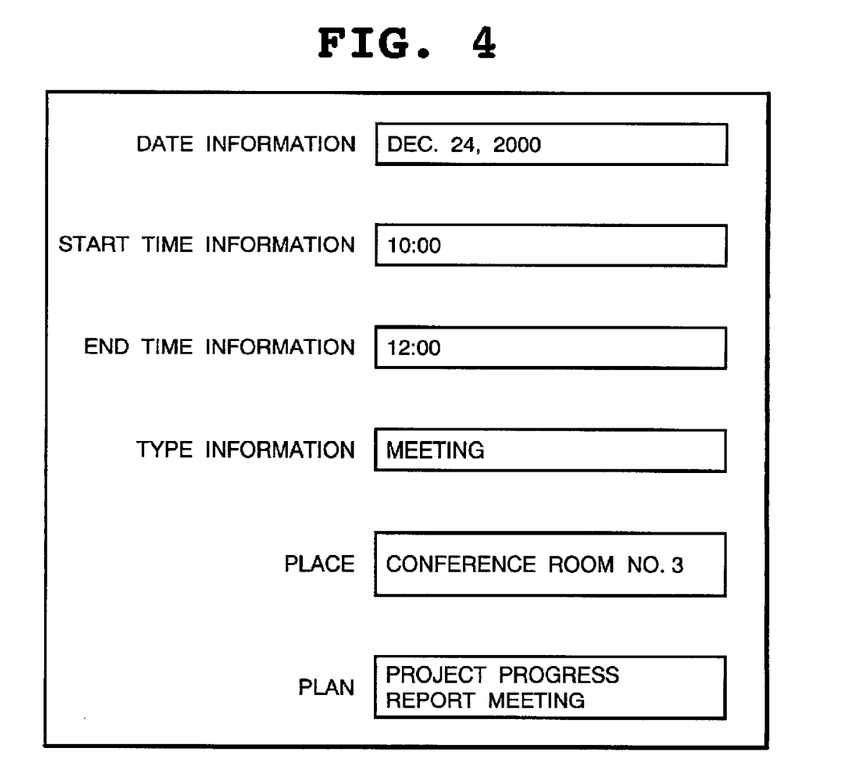
FIG. 4 is a diagram to show an example of schedule data setting according to a first embodiment of the present invention.

FIG. 4 is a diagram showing an example of schedule data according to this embodiment. Schedule setting is specified by the schedule data shown in FIG. 4 for each time zone when the call receiving operation is executed.

As shown in FIG. 4, the schedule data of this embodiment can contain records of place, plan etc. in addition to the items required for schedule setting including date information, start time information, end time information and type information.

If any schedule setting is found here, the control section 13 refers to the schedule data and refers to the date/time and time zone of the schedule setting set by the user (Step 205) and then compares the current time and the time set in schedule setting (Step 206).

Figure 5:
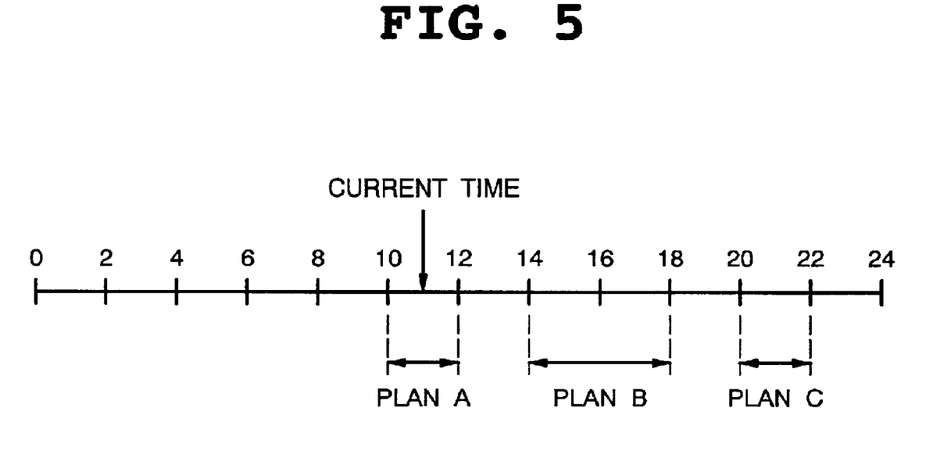
FIG. 5 is a diagram to show an example of times set in schedule setting according to a first embodiment of the present invention.

FIG. 5 is a diagram showing an example of times set in schedule setting according to a first embodiment of the present invention.

As shown in FIG. 5, if the current time is within the time zone specified by schedule setting (Step 207), the control section 13 refers to the storage 14 to see whether any schedule type is set (Step 208). Specifically, the control section 13 checks whether "Plan A", which is the schedule for the current time in FIG. 5, for example, has setting for any of the schedule types (Type A, Type B, Type C and so on) shown in FIG. 3.

If any schedule type setting is found, the control section 13 refers to the setting of the call receiving operation set in advance for the schedule type (Step 209) and, as shown in the example of FIG. 3, makes the call receiving operation linked with the schedule (Step 210).

Thus, the speaker sounding level, type of call receiving sound, vibrator operation, LCD indication and so on can be operated according to the optimum call receiving operation for the schedule time zones set by the user.

Further, if any date/time setting is not found at Step 202, if any schedule is not set at Step 204, if the current time is in the time zone without any schedule setting at Step 207 or if any schedule type setting is not found at Step 208, the control section 13 judges that it is not necessary to use any call receiving operation linked with the schedule and controls the display section 15, the speaker 18 and the vibrator 19 to make the ordinary call receiving operation (Step 211).

The ordinary call receiving operation here means the call receiving operation set to be performed when any of the call receiving operations linked with the schedule is not executed. The operation contents of this ordinary call receiving operation can be, just like the call receiving operations linked with the schedule, set by the user in details with specifying the speaker sounding level, type of call receiving sound, vibrator operation, LCD indication and so on.

Next, a second embodiment of the present invention will be described below.

This embodiment is different from the first embodiment in that the type of the call receiving operation is registered to the schedule data using the place information showing where the user is.

The place information is to specifically show where the user is such as "Home", "In train", "Work place", "Classroom", "Hospital where the user is outpatient" and so on. For each of these places, one of the call receiving operation types is set in the information as shown in the example of FIG. 4. Similarly to plan A, plan B and so on shown in FIG. 5, such place information also shows the user's utilization environment for each time zone.

Call receiving operations corresponding to the place information include, for example, stop of call receiving operation corresponding to the place information "driving a car" and use of the speaker 18 corresponding to the place information "Home".

Figure 7:
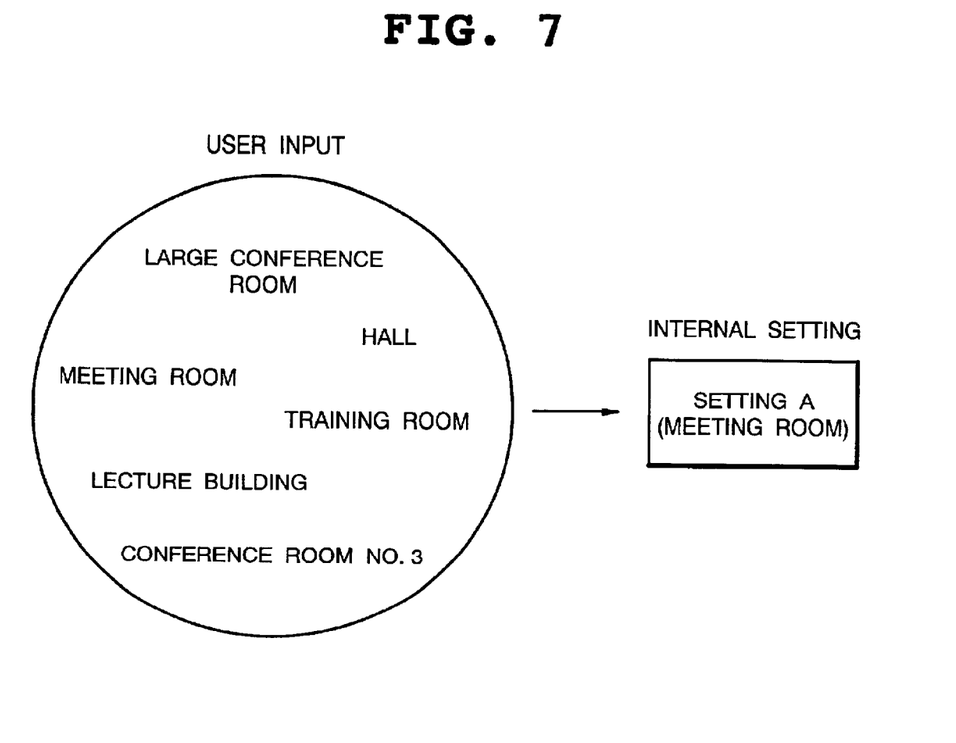
FIG. 7 is a diagram to show the relation between the user input and the internal setting according to a second embodiment of the present invention.

FIG. 7 is a diagram showing an example of relation between the place information and call receiving operation setting according to this embodiment. As shown in FIG. 7, places such as a large conference room or hall are associated with Setting A (Conference Room) as one of the call receiving operation types.

The place information is arbitrarily input by the user during schedule setting. Further, the storage 14 contains several words expected to be input by the user as place information and these words are associated with the internal settings of the call receiving operation patterns. The control section 13 compares the user input with the words held in the storage 14 in advance and recognizes the word input by the user.

Next, the processing according to this embodiment will be described.

Figure 6:
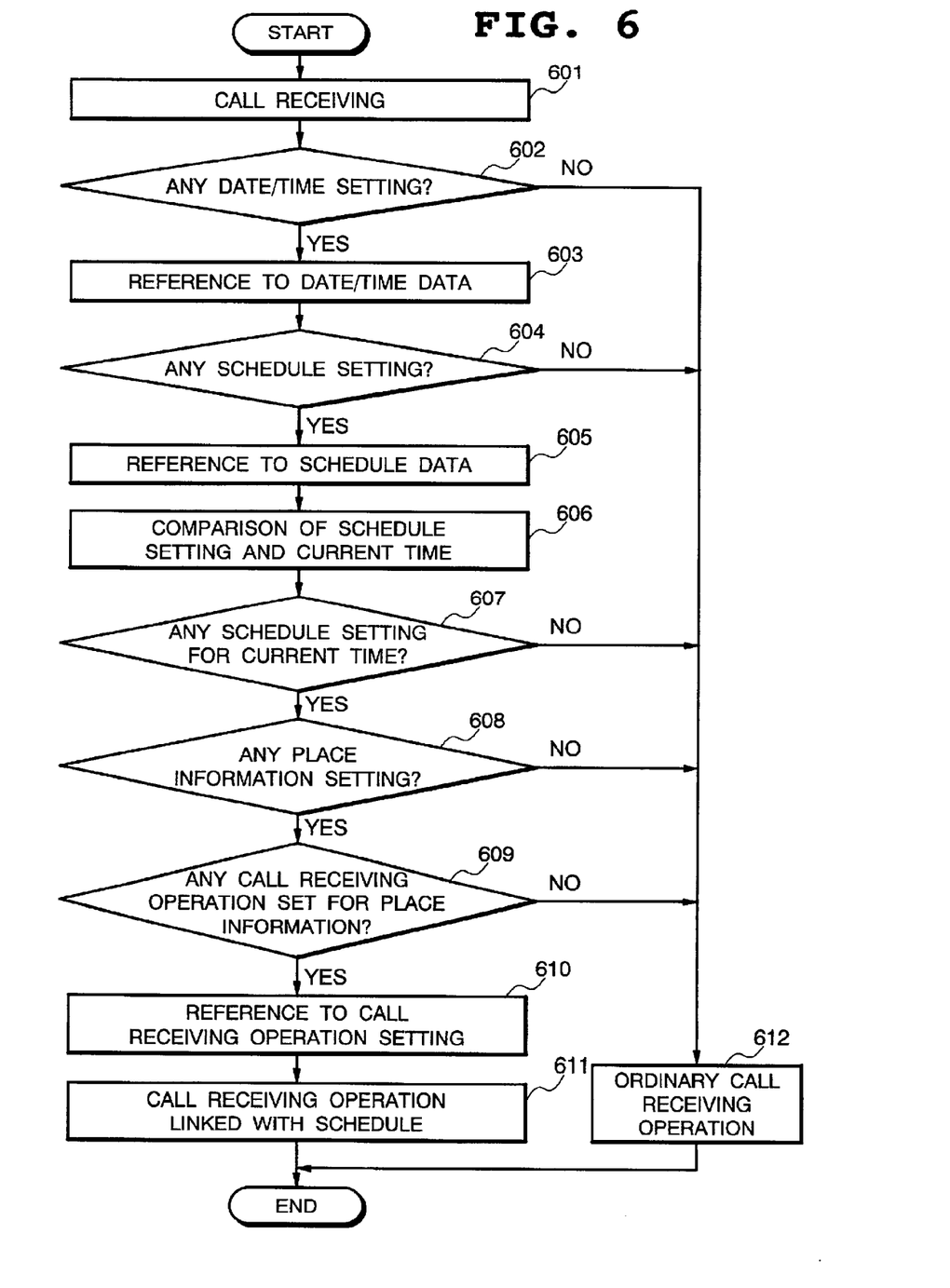
FIG. 6 is a flowchart to illustrate the switching processing for call receiving operations according to a second embodiment of the present invention.

FIG. 6 is a flowchart to illustrate the switching processing for call receiving operations according to this embodiment. The switching processing for the call receiving operations according to this embodiment is mostly the same as the processing from Step 201 to Step 207 in the switching processing for call receiving operations according to the first embodiment in FIG. 2.

Referring to FIG. 6, when the handy terminal 10 receives a call (Step 601), the control section 13 refers to the storage 14 to judge whether the handy terminal 10 has any date/time setting (Step 602).

Next, if any date/time setting is found, the control section 13 refers to the date/time setting in the storage 14 (Step 603) and then refers to the storage 14 to judge whether any schedule setting is provided (Step 604).

Next, if any schedule setting is found, the control section 13 refers to the schedule data, refers to the date/time and time zone of the schedule setting set by the user (Step 605) and then compares the current time and the time set in the schedule setting (Step 606).

The above steps are the same as those in the processing according to the first embodiment.

Next, if the current time is in a time zone with any schedule setting, (Step 607), the control section 13 refers to the storage 14 to see whether any place information is set in the applicable schedule data (Step 608).

If any place information is contained in the applicable schedule data, the control section 13 refers to the setting for the call receiving operations internally set for the place information (Steps 609 and 610) and executes the call receiving operation linked with the place information in the schedule.

Further, if any date/time setting is not found at Step 602, if any schedule is not set at Step 604, if the current time is in the time zone without any schedule setting at Step 607, if any place information is not set at Step 608, or if any call receiving operation for the place information is not set at Step 609, the control section 13 judges that it is not necessary to use any call receiving operation linked with the schedule and controls the display section 15, the speaker 18 and the vibrator 19 to make the ordinary call receiving operation (Step 612).

With the schedule management device according to this embodiment as described above, the user can set the place by specifying where the user is. This method is easy to understand and the user can set and change the schedule easily.

The schedule management method according to the above embodiments can be achieved by realizing the functions of the control section 13 and others on hardware, of course, and also by loading a computer program with the applicable functions to the memory of a computer processor. Such computer program is stored in the magnetic disk, semiconductor memory or other recording medium 50. Being loaded from the recording medium 50 to the computer processor, the program controls the operations of the computer processor and achieves the functions as described above.

The present invention has been described with referring to preferred embodiments and examples above, but the present invention is not necessarily limited to the above embodiments and examples and can be modified in various ways for implementation within the technical scope of the invention.

As described above, the following effects can be achieved according to the schedule management device of the present invention.

Firstly, with the call receiving operations linked with the schedule function, it is not necessary for the user to set and cancel the call receiving operation every time as in conventional devices. The call receiving operations are switched automatically corresponding to the schedule set by the user and the call receiving operation finely corresponding to the user's utilization environments can be achieved.

Secondly, individual call receiving operations including the speaker, vibrator, LED and LCD can be set in details for each type of the call receiving operations and the call receiving operations as set can be specified for each time zone via place information or the like. Thus, the user can easily specify and manage various types of call receiving operations now, though such operation management has been difficult with conventional devices.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A schedule management device comprising:
   one or more call receiving notification means to notify a user that a call from outside is received;
   utilization environment registration means for registration of and reference to a utilization environment schedule containing a utilization environment for each time zone of said user;
   call receiving operation registration means to set each of said utilization environments registered to said utilization environment registration means corresponding to said call receiving notification means; and
   call receiving notification execution means which, upon receipt of any call from outside, selects the current utilization environment of said user registered to said utilization environment registration means based solely on a current time/date, and notifies the user of the call received using said call receiving notification means corresponding to the current utilization environment set in said call receiving operation registration means;
   wherein said utilization environment registration means registers each said utilization environment of said utilization environment schedule by a place information indicating where said user is in each of the time zones; and
   said call receiving operation registration means sets every piece of said place information corresponding to one of said call receiving notification means; and
   said call receiving notification means comprises notification means to notify of the call received by at least one of a sounding operation, a vibration operation, a lighting operation, a display operation, and an arbitrary combination of these operations.

2. The schedule management device as set forth in claim 1, wherein the device is a handy communication terminal provided with schedule management function.

3. A schedule management method comprising:

one or more call receiving notification steps to notify a user that a call from outside is received;

a utilization environment registration step for registration in a schedule management device of and reference to a utilization environment schedule containing a utilization environment for each time zone of said user;

a call receiving operation registration step to set each of said utilization environments registered at said utilization environment registration step corresponding to one of said call receiving notification steps; and a call receiving notification execution step which, upon receipt of any call from outside, selects the current utilization environment of said user registered at said utilization environment registration step based solely on a current time/date, and notifies the user of the call received using said call receiving notification step corresponding to the current utilization environment set at said call receiving operation registration step, wherein said utilization environment registration step registers the utilization environment of the utilization environment schedule by the place information indicating where said user is in each of the time zones;

said call receiving operation registration step sets every piece of said place information corresponding to one of said call receiving notification steps; and said call receiving notification step comprises a notification step to notify the call received by at least one of a sounding operation, a vibration operation, a lighting operation, a display operation, and an arbitrary combination of these operations.

4. A computer readable memory recording a schedule management program to control the computer for execution of schedule management, said schedule management program comprising:

one or more call receiving notification steps to notify a user that a call from outside is received;

a utilization environment registration step for registration in a schedule management device of and reference to a utilization environment schedule containing a utilization environment for each time zone of said user;

a call receiving operation registration step to set each of said utilization environments registered at said utilization environment registration step corresponding to one of said call receiving notification steps; and a call receiving notification execution step which, upon receipt of any call from outside, selects the current utilization environment of said user registered at said utilization environment registration step based solely on a current time/date, and notifies the user of the call received using said call receiving notification step corresponding to the current utilization environment set at said call receiving operation registration step, wherein said schedule management program, at said utilization environment registration step, registers said utilization environment schedule by the place information indicating where said user is in each of the time zones and, at said call receiving operation registration step, sets every piece of said place information corresponding to one of said call receiving notification steps and, said call receiving notification step comprises a notification step to notify the call receiving by at least one of a sounding operation, a vibration operation, a lighting operation, a display operation, and an arbitrary combination of these operations.

5. A schedule management device comprising:

at least one call receiving notification section configured to notify a user that a call from outside is received;

a utilization environment registration section configured to register and to refer to a utilization environment schedule containing a utilization environment for each time zone of the user;

a call receiving operation registration section which sets each of said utilization environments registered to said utilization environment registration section corresponding to one of said call receiving notification section; and a call receiving notification execution section configured, upon receipt of the call from outside, to select the current utilization environment of the user registered to said utilization environment registration section based solely on a current time/date, and to notify the user of the call received using said call receiving notification section corresponding to the current utilization environment set in said call receiving operation registration section, wherein said utilization environment registration section registers the utilization environment schedule by the place information indicating where the user is in each of the time zones, and said call receiving operation registration section sets every piece of the place information corresponding to one of said call receiving notification section;

said call receiving notification section comprises a notification section to notify of the call received by at least one of a sounding operation, a vibration operation, a lighting operation, a display operation and an arbitrary combination of these operations.

* * * * *